US012776526B2

(12) United States Patent
Ha et al.

(10) Patent No.: US 12,776,526 B2
(45) Date of Patent: Oct. 27, 2026

(54) METHOD FOR RECOVERING ACTIVE METAL OF LITHIUM SECONDARY BATTERY

(71) Applicant: SK INNOVATION CO., LTD., Seoul (KR)

(72) Inventors: Hyeon Bae Ha, Daejeon (KR); Hyeon Jung Kim, Daejeon (KR); Sang Ki Kim, Daejeon (KR); Wan Gi Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 632 days.

(21) Appl. No.: 18/333,643

(22) Filed: Jun. 13, 2023

(65) Prior Publication Data

US 2024/0154197 A1 May 9, 2024

Related U.S. Application Data

(63) Continuation of application No. PCT/KR2021/019105, filed on Dec. 15, 2021.

(30) Foreign Application Priority Data

Dec. 22, 2020 (KR) ........................ 10-2020-0181119

(51) Int. Cl.

*H01M 10/54* (2006.01)
*C22B 1/02* (2006.01)
(Continued)

(52) U.S. Cl.

CPC ............... *H01M 10/54* (2013.01); *C22B 1/02* (2013.01); *C22B 5/14* (2013.01); *C22B 7/005* (2013.01); *C22B 26/12* (2013.01)

(58) Field of Classification Search

CPC ...... H01M 10/54; H01M 4/505; H01M 4/525; H01M 10/052; C22B 1/02; C22B 5/14;
(Continued)

(56) References Cited

U.S. PATENT DOCUMENTS

2021/0115532 A1* 4/2021 La ......................... C01G 53/04

FOREIGN PATENT DOCUMENTS

CN 105907977 A 8/2016
CN 108220607 A 6/2018
(Continued)

OTHER PUBLICATIONS

Han et al. Journal of Cleaner Production 263 (2020) 121439 (Year: 2020).*

(Continued)

*Primary Examiner* — Lisa S Park
(74) *Attorney, Agent, or Firm* — IP&T GROUP LLP

(57) ABSTRACT

In a method for recovering an active metal of a lithium secondary battery, positive electrode active material particles including a lithium-transition metal oxide is prepared. The positive active material particles are treated by reduction. The reduction-treated positive active particles are subjected to ultrasonic dispersion and hydration. The hydrated transition metal slurry is recovered. The recovery rate of lithium and transition metal can be increased by disaggregation through ultrasonic dispersion.

9 Claims, 4 Drawing Sheets

(51) Int. Cl.
*C22B 5/14* (2006.01)
*C22B 7/00* (2006.01)
*C22B 26/12* (2006.01)

(58) Field of Classification Search
CPC ......... C22B 7/005; C22B 26/12; C22B 7/001; C22B 7/006; C22B 23/043; C22B 23/0461; C22B 1/10; C22B 23/04; Y02W 30/84
See application file for complete search history.

(56) References Cited

FOREIGN PATENT DOCUMENTS

| | | | | |
|---|---|---|---|---|
| CN | 109750155 | A | | 5/2019 |
| CN | 111936423 | A | | 11/2020 |
| CN | 111945006 | | * | 11/2020 |
| CN | 111945006 | A | | 11/2020 |
| EP | 3715486 | A1 | | 9/2020 |
| JP | 2011-094228 | A | | 5/2011 |
| JP | 4909907 | B2 | | 4/2012 |
| JP | 2012-229481 | | * | 11/2012 |
| JP | 2012-229481 | A | | 11/2012 |
| JP | 2014-203567 | A | | 10/2014 |
| JP | 2017-084681 | A | | 5/2017 |
| KR | 10-0709268 | B1 | | 4/2007 |
| KR | 10-2009-0030152 | A | | 3/2009 |
| KR | 10-2011-0060040 | A | | 6/2011 |
| KR | 10-1897134 | B1 | | 9/2018 |
| KR | 10-2020238 | B1 | | 9/2019 |
| KR | 10-2059050 | B1 | | 12/2019 |
| WO | 2019/199014 | A1 | | 10/2019 |
| WO | 2019/199015 | A1 | | 10/2019 |
| WO | WO2019/199014 | | * | 10/2019 |
| WO | 2020/011765 | A1 | | 1/2020 |

OTHER PUBLICATIONS

International Search Report for the International Application No. PCT/KR2021/019105 issued by the International Searching Authority on Mar. 31, 2022.
Notice of Decision for Rejection for Japanese Patent Application No. 2023-538744 issued by the Japanese Patent Office on Nov. 4, 2025.
Extended European Search Report for European Patent Application No. 21911377.6 issued by the European Patent Office on Jul. 5, 2024.
Office Action for Japanese Patent Application No. 2023-538744 issued by the Japanese Patent Office on Jul. 15, 2025.
Notice of Allowance for Korean Patent Application No. 10-2020-0181119 issued by the Korean Patent Office on May 12, 2026.
Office Action for Chinese Patent Application No. 202180085963.4 issued by the Chinese Patent Office on May 21, 2026.

* cited by examiner

METHOD FOR RECOVERING ACTIVE METAL OF LITHIUM SECONDARY BATTERY

CROSS-REFERENCE TO RELATED APPLICATION

This application is a Bypass Continuation Application of PCT/KR2021/019105 filed on Dec. 15, 2021, which claims priority to Korean Patent Application No. 10-2020-0181119 filed on Dec. 22, 2020. The entire disclosure of each of the foregoing applications is incorporated herein by reference in its entirety.

TECHNICAL FIELD

The present invention relates to a method for recovering an active metal of a lithium secondary battery. More particularly, the present invention relates to a method for recovering an active metal from a cathode of a lithium secondary battery.

BACKGROUND ART

A secondary battery which can be charged and discharged repeatedly has been widely developed and employed as a power source of a mobile electronic-communication device such as a camcorder, a mobile phone, a laptop computer, etc., and a power source of a vehicle such as a hybrid vehicle and an electric vehicle. A lithium secondary battery among the secondary batteries is actively developed and applied due to high operational voltage and energy density per unit weight, a high charging rate, a compact dimension, etc.

A lithium metal oxide may be used as a cathode active material for the lithium secondary battery. The lithium metal oxide may further contain a transition metal such as nickel, cobalt, manganese, etc.

As the above-mentioned high-cost valuable metals are used for the cathode active material, 20% or more of a production cost is required for manufacturing the cathode material. Additionally, as environment protection issues have recently been highlighted, a recycling method of the cathode active material is being researched.

For example, lithium and a transition metal may be separated and recovered by a reductive reaction of a waste cathode active material. However, if conditions of the reductive reaction are not properly controlled, agglomeration and aggregation of active material particles may occur. In this case, a ratio of lithium and the transition metal that cannot be recovered may increase, and a purity of the recovered active metal may also decrease.

For example, Korean Registered Patent Publication No. 10-0709268 discloses an apparatus and method for recycling a waste manganese battery and alkaline battery, but does not suggest a dry-based method for recycling valuable metals with high selectivity and high yield.

DETAILED DESCRIPTIONS OF THE INVENTION

Technical Objective

According to an aspect of the present invention, there is provided a method for recovering an active metal of a lithium secondary battery with high efficiency and high purity.

Summary

A method for recovering an active metal of a lithium secondary battery is provided, the method comprising preparing cathode active material particles containing a lithium-transition metal oxide. The cathode active material particles may be prepared from a used lithium secondary battery as described below. The method further comprises performing a reduction treatment of the cathode active material particles. Then, an ultrasonic wave dispersing hydration of the reduced cathode active material particles is performed and a hydrated transition metal slurry is recovered.

In some embodiments, lithium precursor particles, transition metal oxide particles and transition metal particles may be formed from the cathode active material particles by the reduction treatment.

In some embodiments, aggregates of the lithium precursor particles, the transition metal oxide particles and the transition metal particles may be formed in the reduction treatment.

In some embodiments, the aggregates may be decomposed by the ultrasonic wave dispersing hydration.

In some embodiments, the aggregates may be decomposed into particles having a particle size of 300 μm or less through the ultrasonic wave dispersing hydration.

In some embodiments, the ultrasonic wave dispersing hydration may include a solid-liquid two-phase process.

In some embodiments, an ultrasonic wave having a power of 50 to 110 W may be applied in the ultrasonic wave dispersing hydration.

In some embodiments, an ultrasonic wave having a power to weight of 2.5 to 5.5 W/g based on 1 g of aggregates may be applied in the ultrasonic wave dispersing hydration.

In some embodiments, an ultrasonic wave having a power to weight of 0.6 to 1.4 W/g based on 1 g of the recovered transition metal slurry may be applied in the ultrasonic wave dispersing hydration.

In some embodiments, the reduction treatment of the cathode active material particles may be performed in a fluidized bed reactor using a reductive gas.

In some embodiments, the recovered transition metal slurry may be rehydrated.

In some embodiments, heat-treating the cathode active material particles at a temperature of 500° C. or less may be performed prior to performing the reduction treatment of the cathode active material particles.

Effects of the Invention

According to the above embodiments, the lithium precursor may be recovered from, e.g., a waste cathode active material through a dry-based process using a dry reductive process. Therefore, the lithium precursor may be obtained with high purity without a complicated leaching process or an additional process resulting from an acid solution wet-based process.

In example embodiments, agglomerates generated due to an excessive progress of the dry reductive process or an excessive increase of a heat of the reductive reaction may be resolved through an ultrasonic dispersion. Thus, a recovery ratio of a slurry containing transition metal in a hydration process may be improved, and an amount of unrecovered aggregates may be reduced.

In some embodiments, the ultrasonic dispersion may be performed in a two-phase state of solid and liquid to improve the slurry recovery.

BRIEF DESCRIPTIONS OF THE DRAWINGS

EMBODIMENTS FOR PRACTICING THE INVENTION

Embodiments of the present invention provide a high-purity, high-yield method for recovering an active metal from a lithium secondary battery.

Hereinafter, embodiments of the present invention will be described in detail with reference to the accompanying drawings. However, these embodiments are examples and the present invention is not limited to the specific embodiments described as the examples.

As used herein, the term "precursor" is used to comprehensively refer to a compound including a specific metal to provide the specific metal included in an electrode active material.

Figure 1:
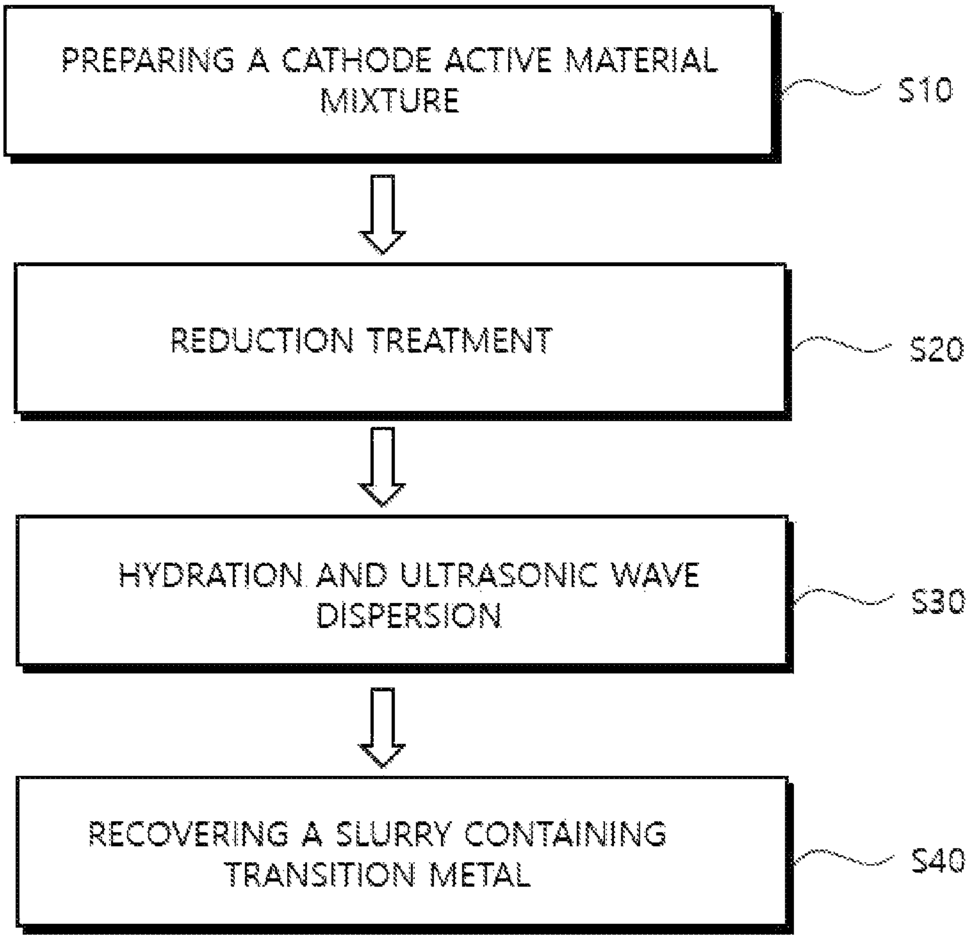
FIG. 1 is a simplified flow chart illustrating a method for recovering an active metal of a lithium secondary battery in accordance with example embodiments.
Figure 2:
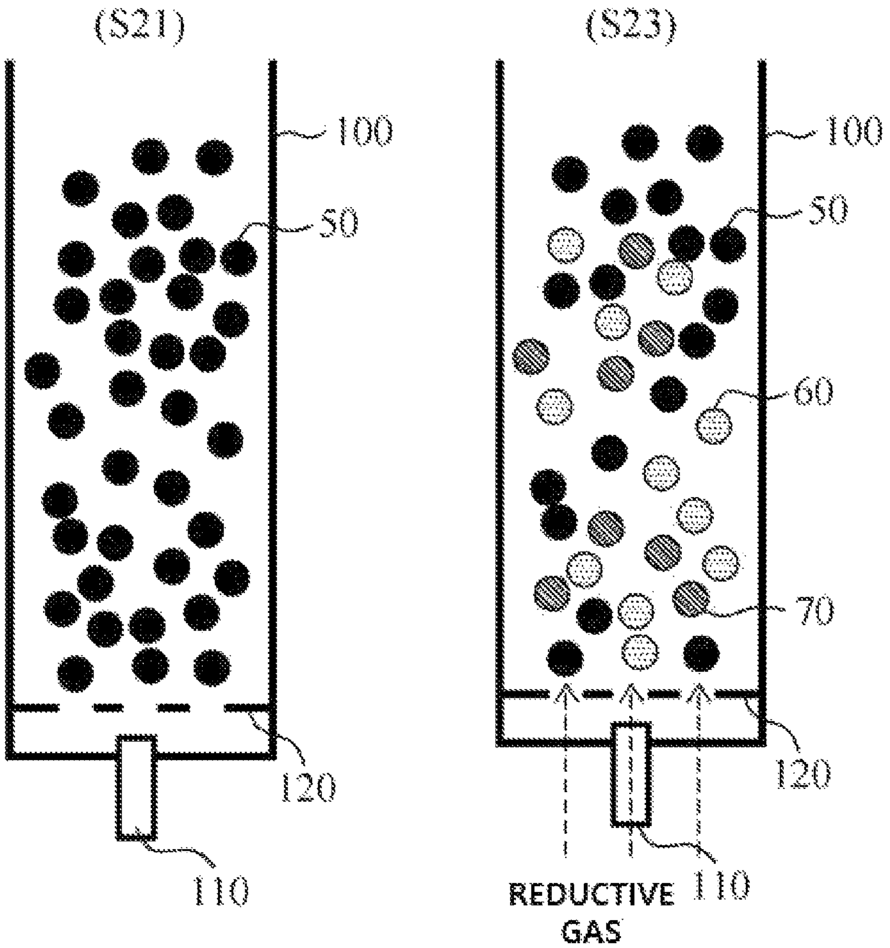
FIGS. 2 to 4 are schematic diagrams showing a particle flow and a phase change in a reductive process and a hydration process.
Figure 3:
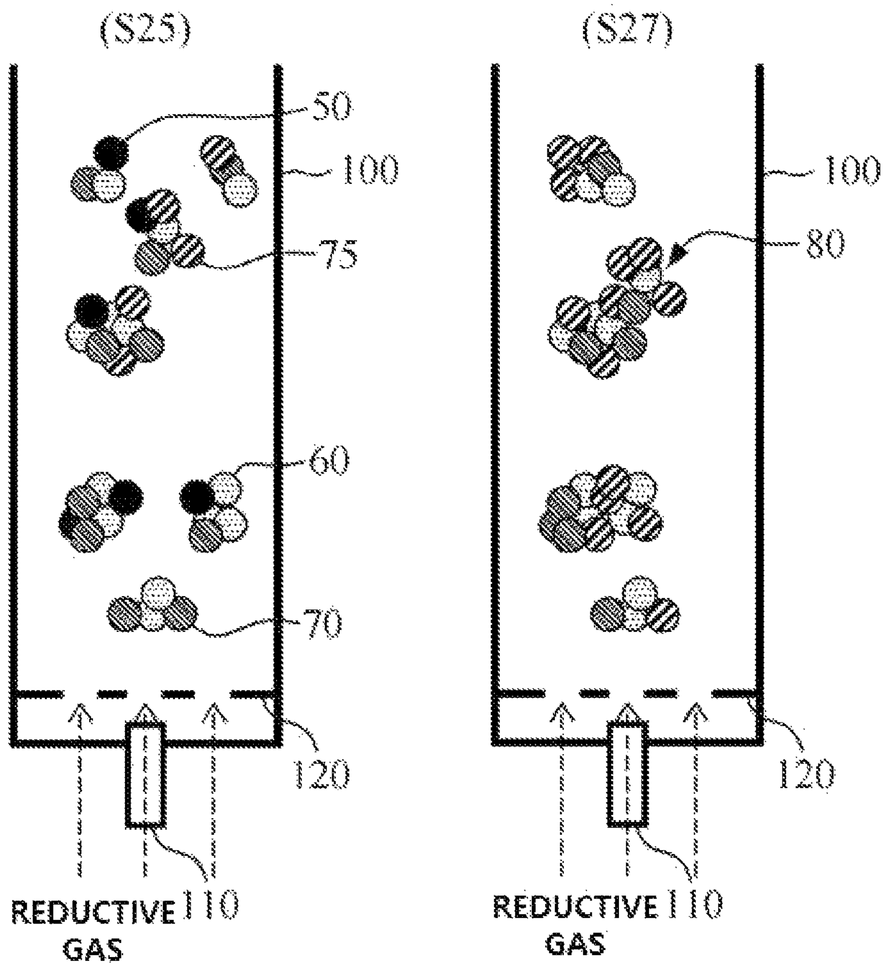
Figure 4:
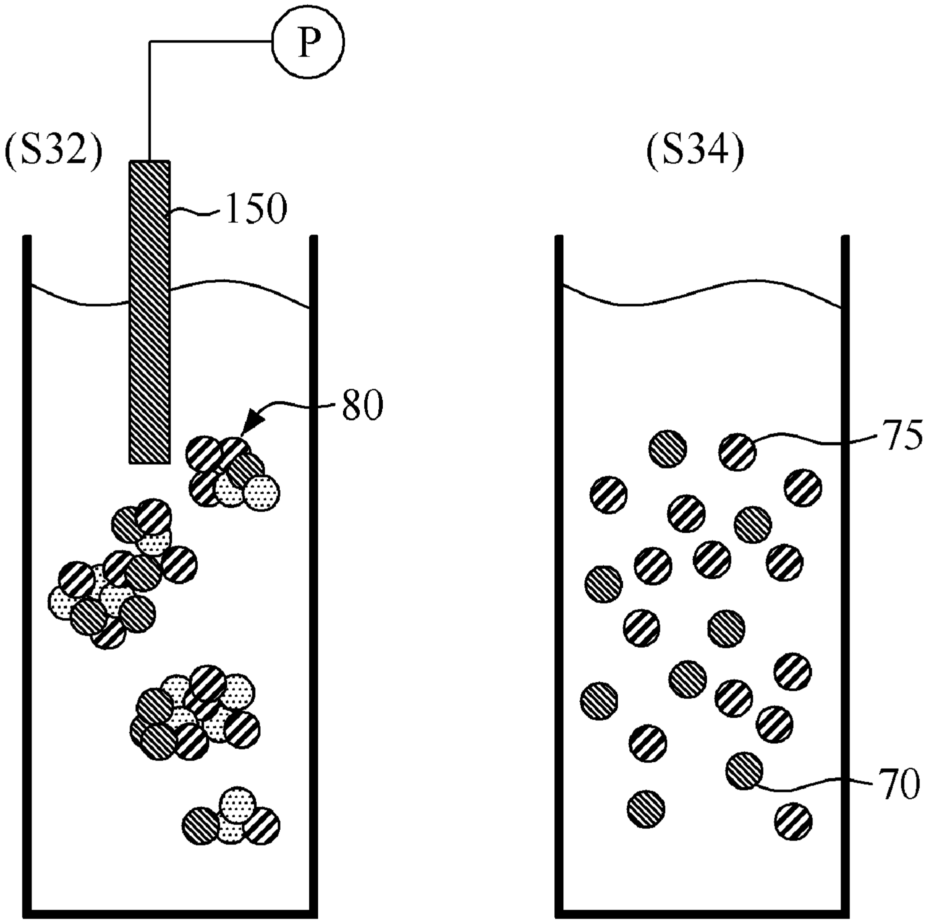

FIG. 1 is a simplified flow chart illustrating a method for recovering an active metal of a lithium secondary battery in accordance with example embodiments. FIGS. 2 to 4 are schematic diagrams showing a particle flow and a phase change in a reductive process and a hydration process.

Referring to FIG. 1, a cathode active material mixture may be prepared in operation S10.

In example embodiments, active material particles (e.g., waste cathode active material particles) may be prepared from a waste cathode of a lithium secondary battery.

The lithium secondary battery may include an electrode assembly including a cathode, an anode and a separation layer interposed between the cathode and the anode. The cathode and the anode may include a cathode active material layer coated on a cathode current collector and an anode active material layer coated on an anode current collector, respectively.

For example, the cathode active material included in the cathode active material layer may include an oxide containing lithium and a transition metal.

In some embodiments, the cathode active material may include a compound represented by Formula 1 below.

$$Li_xM1_aM2_bM3_cO_y \qquad \text{Chemical Formula 1}$$

In Chemical Formula 1, M1, M2 and M3 may include a transition metal selected from Ni, Co, Mn, Na, Mg, Ca, Ti, V, Cr, Cu, Zn, Ge, Sr, Ag, Ba, Zr, Nb, Mo, Al, Ga or B. In Chemical Formula 1, $0<x\leq1.1$, $2\leq y\leq2.02$, $0<a<1$, $0<b<1$, $0<c<1$, and $0<a+b+c\leq1$.

In some embodiments, the cathode active material may be an NCM-based lithium oxide including nickel, cobalt and manganese.

The waste cathode may be recovered by separating the cathode from a waste lithium secondary battery. The waste cathode may include the cathode current collector (e.g., aluminum (Al)) and the cathode active material layer as described above, and the cathode active material layer may include a conductive material and a binder together with the cathode active material as described above.

The conductive material may include, e.g., a carbon-based material such as graphite, carbon black, graphene, carbon nanotube, etc. The binder may include a resin material, e.g., vinylidenefluoride-hexafluoropropylene copolymer (PVDF-co-HFP), polyvinylidenefluoride (PVDF), polyacrylonitrile, polymethylmethacrylate, etc.

In some embodiments, the cathode active material layer may be peeled off from the cathode current collector, and the separated cathode active material layer may be pulverized to generate the cathode active material particles. Accordingly, the cathode active material particles may be manufactured in a powder form, and may be collected in, e.g., a black powder form.

As described above, the cathode active material particles include a lithium-transition metal oxide powder, and may include, e.g., an NCM-based lithium oxide powder (e.g., $Li(NCM)O_2$). In this case, M1, M2 and M3 in Chemical Formula 1 may be Ni, Co and Mn, respectively.

The term "cathode active material mixture" used in the present application may refer to a raw material that is subject to a reductive treatment as described later after the cathode current collector is substantially removed from the waste cathode. In an embodiment, the cathode active material particles may include the NCM-based lithium oxide. In an embodiment, the cathode active material mixture particles may include portions of components derived from the binder or the conductive material.

In some embodiments, an average particle diameter (D50) (an average diameter in a volume cumulative distribution) of the cathode active material mixture may be in a range from 5 μm to 100 μm. Within the above range, a reductive reaction in a fluidized reactor may be easily implemented.

For example, in a process S20, the cathode active material particles may be subjected to a reductive reaction in a reduction reactor 100.

Referring to FIGS. 2 and 3, cathode active material particles 50 described above may be introduced into the reduction reactor 100 (e.g., step S21).

In some embodiments, the cathode active material particles 50 may be heat treated prior to the reductive treatment. The lithium-transition metal oxide before being subjected to the reduction treatment may be of a high purity by removing or reducing impurities such as the conductive material and the binder included in the cathode active material particles 50 by the heat treatment.

A temperature of the heat treatment temperature may be, e.g., about 500° C. or less, from about 100° C. to 500° C., and from about 350° C. to 450° C. Within the above range, decomposition and damages of the lithium-transition metal oxide may be prevented while the impurities may be removed and a high purity lithium-transition metal oxide may be obtained.

In an embodiment, the heat treatment may be performed in the reduction reactor 100 by injecting a carrier gas such as, for example, nitrogen ($N_2$), helium (He), or argon (Ar) through a gas inlet 110. The gas inlet 110 may be disposed at a lower portion of the reduction reactor 100 and a fluidization heat treatment may be performed in the reduction reactor 100.

In an embodiment, the cathode active material particles 50 may be introduced into the reduction reactor 100 after the heat treatment.

For example, in operation S23, the cathode active material particles 50 may be reduced. The reduction reactor 100 may be a fluidized bed reactor. A reductive gas may be injected from a bottom of the reducing reactor 100 through the gas inlet 110, and a fluidized bed may be formed by the cathode active material particles 50 in the reduction reactor 100 during the reductive reaction process.

The reductive gas may include, for example, hydrogen ($H_2$). The reductive gas may further include a carrier gas such as, for example, nitrogen, helium, or argon (Ar).

The reductive gas may be supplied from the bottom of the reductive reactor 100 and may contact the cathode active material particles 50, so that the cathode active material particles 50 may move to a top of the reductive reactor 100 or may remain within the reductive reactor 100 to be reacted with the reductive reaction gas.

As described above, the fluidized bed may be formed by injecting the reductive gas. As the cathode active material particles 50 contact the reductive gas in the fluidized bed to repeatedly ascend, stay and descend therein, a reaction contact time may be increased and dispersion of the particles may be enhanced.

Additionally, the reductive gas may be supplied from the lower portion of the reductive reactor 100 to contact the cathode active material particles 50, so that a reaction region may be expanded as the cathode active material particles 50 move to the upper portion of the reduction reactor 100.

However, the scope of the present invention are not necessarily limited to a fluidized bed reaction. For example, a stationary reaction may be used in which a cathode active material mixture is pre-loaded in a batch reactor or a tubular reactor and then the reductive reaction gas is supplied.

In some embodiments, a dispersion plate 120 may be disposed at the lower portion of the reduction reactor 10. Rising and discharging of the reductive gas may be promoted through injection holes included in the dispersion plate 120.

As the reductive reaction is initiated, lithium precursor particles 60 may be generated from the cathode active material particles 50. For example, a $Li(NCM)O_2$ crystal structure may collapse as the reductive process proceeds, and Li may be released from the crystal structure to be reduced into forms of lithium hydroxide (LiOH), lithium oxide (e.g., $Li_2O$) and/or lithium carbonate ($Li_2CO_3$). In a preferable embodiment, the lithium precursor particle 60 may include lithium hydroxide (LiOH).

Further, transition metals may be reduced from the crystal structure to generate transition metal oxide particles 70. For example, the transition metal oxide particles 70 may include a transition metal oxide such as NiO and CoO.

Referring to FIG. 3, in, e.g., operation S25, transition metal particles 75 may be additionally generated while the reductive reaction additionally proceeds. For example, the transition metal particles 75 may include nickel (Ni) or cobalt (Co). As the transition metal particles 75 are formed, aggregation or gathering of the particles may be initiated according to an increase of a reaction heat.

If the reductive reaction excessively proceeds, in, e.g., operation S27, agglomeration or sintering between the particles may occur, resulting in aggregates 80.

For example, a temperature of the reductive reaction may be adjusted to 500° C. or less to prevent the excessive reduction. However, the temperature at an inside of the reduction reactor 100 may increase to more than 500° C. due to the reaction heat generated during the reductive reaction, and the transition metal oxide particles 70 or the cathode active material particles 50 may be overly reduced. As a result, the transition metal particles 75 may be generated.

Further, the aggregates 80 may be generated by a metal bonding or sintering between the transition metal particles 75, and the lithium precursor particles 60 and the transition metal oxide particles 70 may be attached and included together in the aggregates 80.

Referring to FIGS. 1 and 4, the particles generated by the reductive reaction may be hydrated with an ultrasonic dispersion, e.g., in a operation S30.

For example, water may be supplied to the aggregates 80 generated by the above-described reduction treatment so that the aggregates 80 may be hydrated. The hydration may be performed with the ultrasonic dispersion. The hydration may be performed by introducing water into the reductive reactor 100, or by introducing the aggregates 80 together with water into a separate storage container.

For example, an ultrasonic probe 150 may be immersed in an aqueous solution into which the aggregates 80 are introduced, and then a power may be applied through a power supply unit P.

For example, as indicated as operation S34, the lithium precursor particles 60 may be substantially dissolved in the aqueous solution while the sintering of the aggregates 80 is eliminated through the ultrasonic dispersion hydration. Further, the transition metal oxide particles 70 and the transition metal particles 75 included in the aggregates 80 may be individually separated and dispersed in the aqueous solution in a solid state.

As described above, the ultrasonic dispersion is performed together with the hydration of the lithium precursor particles 60 to decompose the aggregates 80, so that a recovery ratio of the transition metal may be remarkably increased.

Referring again to FIG. 1, a transition metal-containing slurry may be recovered through, e.g., a filtration process, e.g., in a process S40.

As described above, the aggregates 80 may be substantially decomposed into individual particles or fine particles through the ultrasonic dispersion process. Accordingly, an unrecovered fraction remaining as the aggregates 80 may be substantially removed, and transition metal components may be substantially completely recovered into the slurry.

In some embodiments, aggregates having a particle size of 1,000 μm or more may be substantially decomposed and removed through the ultrasonic dispersion process. For example, all of the agglomerates 80 may be decomposed into particles having a particle size of 300 μm or less through the ultrasonic dispersion process.

The transition metal components included in the transition metal slurry may be recovered as a transition metal precursor by an acid treatment. For example, $NiSO_4$, $CoSO_4$ and $MnSO_4$ may each be recovered as the transition metal precursors using a sulfuric acid solution.

The lithium precursor particles 60 dissolved in the aqueous solution may be recovered as a lithium precursor in the form of lithium hydroxide through, e.g., a crystallization process. In some embodiments, a rehydration process (e.g., a water washing process) may be performed for the transition metal slurry. Lithium components remaining in the transition metal slurry may be dissolved again by the rehydration, thereby increasing a recovery rate of the lithium precursor.

As described above, according to example embodiments, the hydration and dispersion process may be substantially performed as a solid-liquid two-phase process using an ultrasonic wave. Accordingly, the aggregation elimination time may be shortened and a transition metal recovery ratio close to 100% may be realized.

In a comparative example, water is introduced into the reduction reactor 100 to decompose the aggregates 80, and then a fluidized hydration may be performed by supplying a carrier gas through the gas inlet 110.

In this case, the dispersion process is performed in a solid-liquid-gas three-phase process, and thus the time for eliminating the aggregates may be excessively increased, and the recovery ratio of lithium and transition metals may also be significantly reduced.

However, according to the above-described example embodiments, the re-aggregation of the particles may be prevented and the recovery ratio of lithium and the transition metals may be significantly increased by shortening the aggregation elimination time through the two-phase dispersion process using the ultrasonic wave.

In some embodiments, the power (W) applied during the ultrasonic dispersion may be 50 W or more. In this case, the dispersing time may be shortened to obtain substantially improved recovery ratios of the transition metals and lithium.

In an embodiment, the power (W) applied during the ultrasonic dispersion may be 50 W to 110 W. For example, if the applied power exceeds 110 W, no further increase in recovery rate is obtained, which may be economically undesirable.

In some embodiments, the power to weight applied per 1 g of the aggregates 80 may be 2.5 W/g or more, or from 2.5 W/g to 5.5 W/g.

In some embodiments, the power applied per 1 g of the recovered transition metal slurry may be 0.6 W/g or more, or from 0.6 W/g to 1.4 W/g or more.

Hereinafter, experimental examples including specific examples and comparative examples are proposed to more concretely describe the present invention. However, the following examples are only given for illustrating the present invention and those skilled in the related art will obviously understand that various alterations and modifications are possible within the scope of the present invention.

Examples 1 kg of a cathode material separated from a waste lithium secondary battery was heat treated at 450° C. for 1 hour. The heat-treated cathode material was cut into small units and pulverized through a milling to obtain a sample of a Li—Ni—Co—Mn oxide cathode active material. 200 g of the cathode active material sample was put into a fluidized bed reactor, and 100% nitrogen gas was injected from a bottom of the reactor at a flow rate of 5.5 L/min while maintaining an internal temperature of the reactor at 480° C. to perform a fluidization heat treatment for 3 hours.

After the heat treatment process, the temperature of the reactor was lowered to 460° C., and a mixed gas of 20 vol % hydrogen and 80 vol % nitrogen was injected from the bottom of the reactor at a flow rate of 5.5 L/min for 4 hours to perform a reductive reaction. During this process, the temperature in the fluidized bed reactor was maintained at 460° C. After the reductive reaction operation, the temperature of the reactor was lowered to 25° C., and 20 g of aggregates were collected.

60 g of water was added to 20 g of the aggregates, and an ultrasonic probe was immersed in the aqueous solution, and then an aggregation removal process was performed under the conditions of power and dispersion time shown in Table 1.

Comparative Example

In the same method as that in the above Example, 60 g of water was added to 20 g of the aggregate collected by performing the reductive reaction, and dispersion was performed for 300 minutes while supplying nitrogen ($N_2$) gas into the aqueous solution instead of performing the ultrasonic dispersion.

After collecting the transition metal-containing slurry through the dispersions obtained from Examples and Comparative Example, a water washing process was performed. Thereafter, a slurry recovery ratio and a lithium recovery ratio were measured as follows.

1) Measurement of Slurry Recovery Ratio

A weight of the aggregates produced after the reductive process (A) and a weight of the aggregates in a solid phase (B) remaining at an inside of the reactor without being dispersed in the form of a slurry after the dispersion were measured to calculate the slurry recovery ratio (=(1−B/A)*100) (%)).

2) Measurement of Lithium Recovery Ratio

After additionally adding water in an amount of 19 times by weight of the slurry to the slurry dispersion and stirring, lithium precursors in which lithium hydroxide and lithium carbonate were dissolved in water were recovered, and a weight of lithium dissolved in water relative to a weight of lithium in the initial cathode active material sample were measured to calculate the lithium recovery ratio (%).

The evaluation results are shown together in Table 1 below.

TABLE 1

| | Example 1 | Example 2 | Example 3 | Example 4 | Example 5 | Example 6 | Comparative Example |
|---|---|---|---|---|---|---|---|
| supplied power (W) | 5 | 20 | 50 | 50 | 110 | 110 | — |
| supplying time (min) | 30 | 30 | 5 | 15 | 3 | 5 | |
| slurry recovery ratio (%) | 25 | 37 | 82 | 100 | 86 | 100 | 75 |
| lithium recovery ratio (%) | 20 | 30 | 72 | 95 | 76 | 95 | 64 |

Further, power was converted based on 1 g of the recovered slurry and 1 g of the aggregate in Examples, and is shown in Table 2 below.

TABLE 2

| | Example 1 | Example 2 | Example 3 | Example 4 | Example 5 | Example 6 |
|---|---|---|---|---|---|---|
| supplied power based on 1 g of slurry (W/g) | 0.06 | 0.25 | 0.63 | 0.63 | 1.38 | 1.38 |
| supplied power based on 1 g of aggregate (W/g) | 0.25 | 1.00 | 2.50 | 2.50 | 5.50 | 5.50 |

Referring to Tables 1 and 2, in Examples where the ultrasonic dispersion hydration was performed, the improved recovery ratios were achieved within a shortened dispersion time compared to that from a Comparative Example in which the three-phase dispersion process was performed.

For example, in Examples 3 to 6 where the ultrasonic dispersion was performed using, e.g., a power supply of 50 W or more, the slurry recovery ratio of 80% or more and the lithium recovery rate of 70% or more were obtained.

What is claimed is:

1. A method for recovering an active metal of a lithium secondary battery, comprising:

preparing cathode active material particles containing a lithium-transition metal oxide;

performing a reduction treatment of the cathode active material particles using a reductive gas including hydrogen gas to form lithium precursor particles, transition metal oxide particles, and transition metal particles from the cathode active material particles, wherein aggregates of the lithium precursor particles, the transition metal oxide particles, and the transition metal particles are formed in the reduction treatment;

performing an ultrasonic wave dispersing hydration of the aggregates; and recovering a hydrated transition metal slurry.

2. The method of claim 1, wherein the aggregates are decomposed into particles having a particle size of 300 μm or less through the ultrasonic wave dispersing hydration.

3. The method of claim 1, wherein the ultrasonic wave dispersing hydration comprises a solid-liquid two-phase process.

4. The method of claim 1, wherein the ultrasonic wave dispersing hydration comprises applying an ultrasonic wave having a power of 50 W to 110 W.

5. The method of claim 1, wherein the ultrasonic wave dispersing hydration comprises applying an ultrasonic wave having a power to weight of 2.5 W/g to 5.5 W/g based on 1 g of aggregates.

6. The method of claim 1, wherein the ultrasonic wave dispersing hydration comprises applying an ultrasonic wave having a power to weight of 0.6 W/g to 1.4 W/g based on 1 g of the recovered transition metal slurry.

7. The method of claim 1, wherein the reduction treatment of the cathode active material particles is performed in a fluidized bed reactor.

8. The method of claim 1, further comprising rehydrating the recovered transition metal slurry.

9. The method of claim 1, further comprising heat-treating the cathode active material particles at a temperature of 500° C. or less prior to performing the reduction treatment of the cathode active material particles.

* * * * *